United States Patent [19]

DeMarco

[11] Patent Number: 4,718,925

[45] Date of Patent: Jan. 12, 1988

[54] PRIMARY MATERIAL COLLECTION RECEIVER

[76] Inventor: Thomas M. DeMarco, 5815 N. Cicero, Chicago, Ill. 60646

[21] Appl. No.: 910,073

[22] Filed: Sep. 22, 1986

[51] Int. Cl.⁴ ............................................. B01D 46/02
[52] U.S. Cl. ........................................ 55/367; 55/373; 55/380; 55/429
[58] Field of Search ................. 55/364, 367, 369, 380, 55/373, 429; 383/17, 20, 100, 102, 103, 113

[56] References Cited

U.S. PATENT DOCUMENTS

| | | | |
|---|---|---|---|
| 2,467,503 | 4/1949 | Scriven | 55/373 X |
| 3,751,881 | 8/1973 | Hughes | 55/367 |
| 3,999,653 | 12/1976 | Haigh | 383/102 X |
| 4,010,784 | 3/1977 | Nattrass et al. | 383/17 |
| 4,229,193 | 10/1980 | Miller | 55/380 X |
| 4,467,494 | 8/1984 | Jones | 55/364 X |

Primary Examiner—Charles Hart
Attorney, Agent, or Firm—Jeffrey Michael Morris

[57] ABSTRACT

A special bag assembly provides a primary material collection receiver to efficiently, effectively, and safely collect, remove, and dispose asbestos and other hazardous material without exposing surrounding personnel to the collected asbestos or other hazardous material. The primary material collection receiver has a porous or perforated inner bag positioned within the interior of a solid imperforate bag, a perforated inner shell to accommodate expansion of the bags, a shroud to prevent hazardous material from contaminating the outside of the outer bag, and a vacuum tank surrounding the shroud.

8 Claims, 3 Drawing Figures

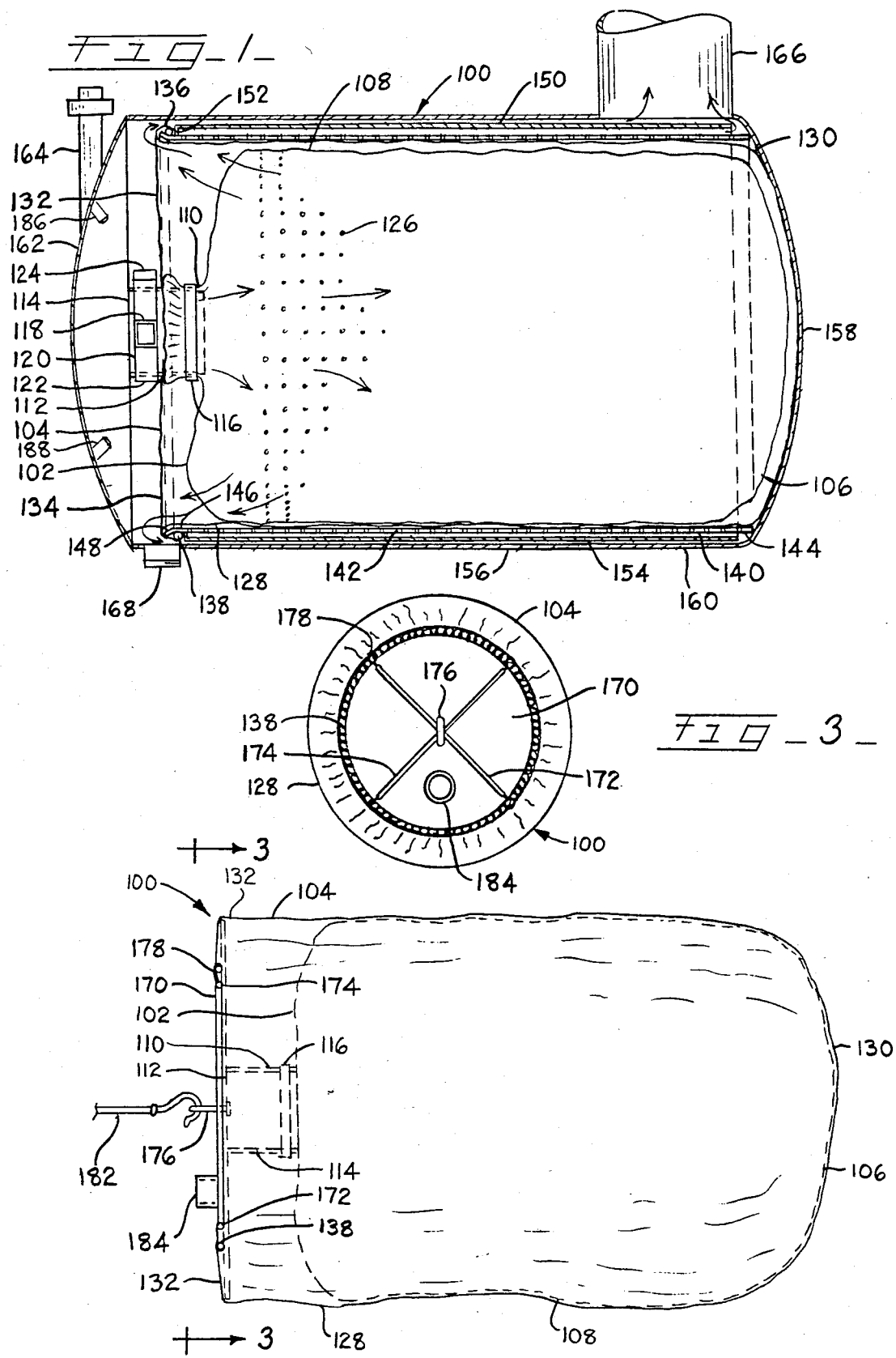

PRIMARY MATERIAL COLLECTION RECEIVER

BACKGROUND OF THE INVENTION

This invention pertains to bags and, more particularly, to a bag assembly for collecting, containing, sealing, and disposing asbestos and other hazardous material.

In the past decade, government studies and numerous health reports have linked exposure to asbestos fibers with serious diseases including asbestoses, fibrosis, and lung cancer. Asbestoses has also been thought to cause or aggravate other maladies, such as emphysema, tuberculosis, bronchitis, asthma, pneumonia, inflammations, and infections. Many people who worked in asbestos manufacturing plants or were employed installing asbestos insulation, have developed cancer and died.

Asbestos was commonly used as an insulator for houses, schools, factories, and public buildings. Asbestos fibers are readily circulated in the air and are dangerous if inhaled. The presence of asbestos in insulation in buildings may be harmful and injurious to the health, safety, and well being of children and adults alike, if not removed.

Asbestos contamination in buildings can be cured by removal. Asbestos removal, however, is not easy. Various industrial vacuum cleaners, loaders, and collectors have been tried but have not been very effective. Furthermore, removal of conventional containers, receptacles, hoppers, bins, or bags containing collected asbestos often expose the operator and surrounding personnel to concentrated amounts of the collected asbestos which can be dangerous, harmful, and even fatal.

Emissions of asbestos and other hazardous material are not only dangerous and troublesome, but are particularly aggravating and grievous in schools, houses, public buildings, and where relatively dust-free conditions and sterile environments are required, such as in medical supply houses and in food processing plants.

Over the years a variety of vacuum bags, bulk material bags, garbage bags, and other types of bags have been suggested for collecting and storing refuse and other material, Typifying some of these prior art bags are those found in U.S. Pat. Nos. 3,961,655; 4,010,784; 4,207,937; and 4,307,764. These prior art bags have not been very successful for safely collecting hazardous material, such as asbestos.

It is, therefore, desirable to provide an improved bag assembly which overcomes most, if not all, of the preceding problems.

SUMMARY OF THE INVENTION

An improved bag assembly provides a primary material collection receiver to facilitate effective removal, vacuuming, and collection of asbestos and other hazardous material. Advantageously, the novel bag assembly has special closure equipment to provide for the safe disposal of the collected asbestos and other material without exposing surrounding personnel to the collected asbestos and other hazardous material.

To this end, the novel bag assembly has an inner bag and at least one outer bag. A rigid perforated shell can annularly enclose the outer bag to provide for controlled expansion of the bags and facilitate in vacuum suctioning of the bags. A solid annular shroud can extend diametrically outwardly of the perforated shell to cover the perforations (holes) of the shell and substantially prevent the outside of the outer bag from being contaminated with asbestos or other hazardous material. An external (outer) vacuum tank can enclose and house the shroud, shell, and bags to contain and control the flow of asbestos or other hazardous material.

The inner bag is flexible and positioned within the interior of the outer bag. An inlet tube can extend through the access opening and open end of the inner bag and can be secured to the neck of the inner bag, such as by a detachable clamp. The inner bag can be a porous membrane, a fabric filter, or a perforated bag. Desirably, the inner bag is fluid permeable to permit the passage of air and other gases as well as water and other liquids containing fines, and is fibrous impervious to block and prevent the passage of elongated asbestos fibers and other large particulates of hazardous material to accommodate gross cut separation, collection and containment of the asbestos and other material.

The outer bag is positioned about the inner bag and preferably against the interior surface of the perforated shell. The outer bag is flexible, solid, pliable, and imperforate, and can be fluid impermeable. The mouth or outer access opening of the outer bag is open during vacuum suctioning.

In order to seal the bags when the inner bag is filled, a closure plate comprising a disc is placed against the open end of the outer bag. The closure plate closes and seals the outer access opening of the outer bag. The closure plate can be secured to the outer bag by one or more springs and/or draw strings. The inlet tube can be detached and placed against the inner surface of the closure plate within the interior of the outer bag. An eyebolt or eyelet can extend outwardly from the closure plate to facilitate removal of the bags from the tank, shroud, and shell.

A more detailed explanation of the invention is provided in the following description and appended claims taken in conjunction with the accompanying drawings.

BRIEF DESCRIPTION OF THE DRAWINGS

FIG. 1 is a cross-sectional side view of a primary material collection receiver comprising a bag assembly and bulk separator compartment in accordance with principles of the present invention;

FIG. 2 is a cross-sectional side view of the primary material collection receiver with a closure plate secured against the sides of the outer bag and showing the hook of a forklift truck pulling the bags away from the interior of the vacuum tank of the bulk separator compartment; and FIG. 3 is a front view of the primary collection receiver taken substantially along line 3—3 of FIG. 2.

DETAILED DESCRIPTION OF THE PREFERRED EMBODIMENT

Referring to the Drawings, a bag assembly 100 provides a primary material collection receiver and bulk separator compartment for separating, removing, collecting, containing, sealing, and safely disposing asbestos. While the bag assembly is particularly useful to remove asbestos, it can also be used to separate, remove, collect, contain, seal, and safely dispose other hazardous material which comprise dry, wet, or fluid entrained, flowable materials such as fibers, slivers, chips, granular material, pellets, chunks, powders, slurries, liquids, particulate matter, debris, and/or waste.

The bag assembly has an inner collection membrane bag 102 positioned within the interior of at least one outer protection membrane bag 104. The inner bag 102 has a closed concave rearward end or rounded bottom 106 and an elongated circular, tubular sidewall 108 which extends longitudinally (axially) forwardly from the bottom 106 and terminates in a neck 110 or top portion at its front end about an inner access opening and inlet 112. The neck 110 is detachably connected, compressibly secured, and clamped against a disposable plastic inlet tube 114 by a detachable collar 116 or hose clamp. The inlet tube 114 extends into the inlet access opening 112 of the inner bag. A removable, inlet tube-retainer bar 118 and inlet tube-clamp assembly 120 comprising an over center hinged locking clamp 122 with a S-shaped bar support 124 can be releasably connected and securely engaged to the inlet tube 114 at a location spaced forwardly of the inner bag 102 and collar 116 to help center and support the inlet tube 114.

The inner bag 102 is flexible and expandable within the interior of the outer bag 104 from a deflated storage position to an inflated expanded collection position. The sidewall 108 of the inner bag is porous, perforated, or foraminous with a set of pores, perforations, openings, apertures, or holes 126 to provide an array of fluid flow passageways. The fluid flow passageways 126 extend from a position spaced rearwardly of the neck 110 and inlet access opening 112 to a position in proximity to the closed bottom rearward end 106 of the inner bag. The fluid flow passageways 126 are of a size, shape, pattern, and matrix arrangement to block and prevent the passage of and collect elongated asbestos fibers and large particulates of hazardous matter while allowing the passage of fluid, such as air and water, containing smaller minute particulates of asbestos and/or smaller particulates of other hazardous material. The fluid flow passageways 26 provide a porous or sieve-like sidewall 108 which serves to make a gross cut separation of the larger particles of asbestos and other hazardous material from the asbestos fines and smaller particulates of hazardous material.

The outer bag 104 is spaced outwardly and positioned about the inner bag 102. The outer bag is flexible, solid, pliable, and imperforate. The outer bag is expandable about the exterior of the inner bag from a deflated storage position to an inflated expanded collection (vacuuming) position. Preferably, the outer bag 104 has a maximum diameter and expansion larger than the inner bag 102 so that the solid imperforate sidewall 128 of the outer bag is spaced radially outwardly of the perforated sieve-like sidewall 108 of the inner bag when the bags are in their expanded collection positions.

The outer bag 104 can be a single or double ply, membrane bag or a double bag. The outer bag has closed concave rearward end or rounded bottom 130 and an imperforate, solid, elongated, circular tubular sidewall 128 which extends longitudinally (axially) forwardly from the bottom 130 and terminates in an open end or outer neck 132 at its front end about an outer access opening and outlet 134. The outer access opening 134 provides a mouth or outlet for the egress (exiting) of air and water containing asbestos fines and smaller particles of hazardous material. The outer rim or edge 136 of the open end of the outer bag is sewn or otherwise securely connected about or attached to an annular, circular, retainer spring 138 or circular draw string.

The outer and inner membrane bags can be made of canvas or other waterproof fabric, rubber, rubberized material, paper or paperboard coated or otherwise treated with water resistant material, or plastic, such as polypropylene, reinforced vinyl, or polyvinylchloride (PVC). Other materials can be used. For enhanced strength and more effective sealing, the sidewalls of the bags are preferably seamless.

A rigid, open ended, foraminous, circular, inner tubular shell 140 provides an inner air distribution tube which is positioned diametrically outwardly and annularly about the sidewall 128 of the outer bag 104. Preferably, the interior (inner) surface of the inner shell has a maximum inside diameter less than the maximum diametric span of sidewall 128 of the outer bag 104 to engage the outer exterior surface of the outer bag's sidewall 128. The inner shell comprises an annular perforated tube with an array, matrix, and set of air holes, apertures, perforations, or openings which provide pneumatic vacuum passageways 142. The vacuum passageways provide for passage of air and water during use to create a vacuum suction which expands and draws the outer bag's sidewall against the interior surface of the inner shell.

The inner shell 140 has an open rearward end 144 positioned generally about the bottom of the outer and inner bags and an open forward end 146 positioned about the neck of the inner bag. The open forward end 146 of the inner shell provides an outlet opening with an outwardly flared lip or rim 148 which abuts against and supports the open end of the outer bag. During vacuum separation and collection, the annular retainer spring 138 is seated against the rearward portion of the flared lip 148 of the inner shell and the open end portion of the outer bag is stretched over the forward portion of the flared lip of the inner shell.

In order to protect and prevent backflow contamination of the outer exterior surface of the outer bag 104, a solid shroud 150 extends about the vacuum passageways 142 of the inner shell 140. The shroud 150 has an annular end 152, which extends diametrically outwardly from the forward end 146 of the inner shell in proximity to the flared lip 148, and has a rigid, elongated annular, circular skirt 154, which extends longitudinally (axially) rearwardly from the annular end 152 of the shroud to a position slightly forwardly of the rearward end 144 of the inner shell 140. The skirt provides a protective barrier to cover the vacuum passageways of the inner shell.

A rigid vacuum tank 156 provides a substantially solid outer shell which is positioned about, houses, and encloses the inner bag 102, inlet tube 114, outer bag 104, inner perforated shell 140, and shroud 150. The vacuum tank 156 has a rounded rearward end portion and concave bottom 158 to arcuately support and abut against the bottom of the outer bag 104, an elongated annular, circular sidewall 160 which extends longitudinally (axially) forwardly from the rearward end 140 of the tank, and a pivotable rounded concave lid, hatch or access door 162 which is hinged to the front portion of the sidewall of the tank to close the tank and permit access into the tank to insert, seal (close), and remove the inner and outer bags when the inner bag is filled with the collected material. The door can have as a handle and lock, such as a turn buckle latch, and can be sealed to the sidewall of the tank by a door gasket or other seal. An inlet pipe (not shown) extends longitudinally (axially) through the central portion of the door and is connected to the inlet tube. The inlet pipe can be sealed to the inlet tube by an inlet tube gasket or other seal. The inlet pipe can extend outwardly of the door and can terminate in a coupling for attachment to a vacuum inlet hose or suction line.

A tank vacuum pressure, relief valve and vacuum breaker 164 can be connected to and extend from the door 162 of the tank to relieve the suction pressure and facilitate opening of the door. A material packing, vacuum pressure relief valve and vacuum breaker can be connected to and extend radially from the inlet pipe at a location spaced outwardly of the door 162 and bags to block the vacuum suction when the inner bag is filled, such as when the inner bag reaches a resistance pressure of 9 psi, as well as to permit intermittent periodic surges of air to clean the inlet tube and compress (pack) the collected asbestos and other material in the inner bag 102.

An outlet tube 166 or tank discharge pipe extends radially outwardly and upwardly from the sidewall of the vacuum tank 156 in proximity to the tank's rearward end 158. A water drain pipe 168 extends radially outwardly and downwardly from the sidewall of the vacuum tank in proximity to the door 162 and flared lip 148 of the inner shell 140.

The sidewall 160 of the vacuum tank 156 is positioned about and spaced radially outwardly of the shroud 150 to provide an annular chamber therebetween for passage of air and water containing asbestos fines and smaller particulates of other hazardous material. The air and water containing the asbestos fines and particulates of other matter flow from the outlet opening 134 of the inner bag and inner shell, through the annular chamber, to the outlet tube 166 of the vacuum tank.

The vacuum tank 156, shroud 150, and inner shell 140 can be made of steel or other metal.

In order to safely seal and close the bags when the inner bag is filled with collected material, a circular closure plate or disc 170 is provided. The closure plate is solid, substantially rigid, and impervious to the passage of asbestos and other hazardous material. The closure plate engages the open end of the outer bag 104 and closes the outer access opening 134 of the outer bag. The annular retaining spring 138 of the outer bag is removed from compressive engagement with the flared lip 148 of the inner shell 140 and slipped over the closure plate. The retaining spring 138 has a retracted (unexpanded) normal diameter smaller than the flared lip 148 of the inner shell 140 and the peripheral outer circular edge of the closure plate 170. Elastic draw cords 172 and 174 can be crisscrossed through an eyebolt or eyelet 176 and secured to the annular retaining spring 138 by S-hooks 178 as shown in FIG. 3. The eyebolt or eyelet 176 extends longitudinally outwardly (forwardly) from and is connected to the closure plate 170. An elongated hook 182 can be attached to the eyelet and pulled with a forklift truck to remove the closed sealed bags from the vacuum tank.

A vacuum hose connection 184 can extend longitudinally (axially) forwardly from the closure plate for connection to an optional vacuum hose. The vacuum hose connection is radially offset from the eyelet and center of the closure plate.

In use, the inner and outer bags 102 and 104 are installed in the vacuum tank 156 as shown in FIG. 1 and the door 162 of the tank is closed. Asbestos and other hazardous material are vacuumed into the primary material collection receiver 100 through the inlet hose, pipe, and tube 114 at a vacuum suction pressure, e.g. 18" Hg, by activating associated vacuum equipment, such as a blower engine and compressor engine. This will open the tank vacuum pressure relief valve (vacuum breaker) 164 connected to the tank door and the material packing, vacuum relief valve (vacuum breaker) connected to the inlet pipe. The air flow carrying the material vacuumed into the inlet tube 114 will flow rearwardly into the perforated inlet collection bag 102 where the asbestos fibers and larger particulates of vacuumed material will be deposited and collected. The air exits the inner collection bag 102 by flowing outwardly through the holes or pores providing the fluid flow passageways 126 of the inner bag.

The effluent air containing asbestos fines and smaller particulates of vacuumed matter then flows forwardly through the gap (space) between the inner perforated bag 102 and the outer solid bag 104 which has been expanded and pulled against the perforated inner tube comprising the inner shell 140 by air flowing radially outwardly through the perforations 154 of the inner shell. The air gap between the inner and outer bags will be maintained by the air flow because of the pneumatic circuitry provided by the primary material collection receiver 100. The solid outer bag 104 provides secondary containment for the collected material in the inner bag 102.

The effluent air containing asbestos fines and smaller particulates of vacuumed matter exits the outer access opening (outlet) 134 of the outer bag and passes rearwardly through the annular chamber (gap) between the shroud 150 and the tank's circular sidewall 160 into the outlet tube 166 for passage to one or more filters or filtration collection devices (compartments) to remove the remaining fines and smaller particulates before the cleaned air flows to the vacuum pump and is discharged to the atmosphere. The shroud 150 protects the exterior outer surface of the outer bag 104 from becoming dusted and contaminated with entrained asbestos fines and particulates being carried by the exiting air in the annular chamber between the shroud 150 and the tank's circular sidewall 160.

During vacuuming, the asbestos fibers and other particulates collected in the inner perforated bag 102 become packed and compressed. The packing of vacuumed material in the perforated inner bag 102 is the result of resistance to air flow through the collected material in the inner bag as the inner bag fills. As filling progresses, the resistance to air flow at the vacuum pump, air blower, or compressor will increase, causing the asbestos fibers and other particulates to be packed and compress tighter together, leaving less voids (gaps) between the collected material until a significant mass resistance to flow reaches, such as at about 18" Hg. Lesser or greater vacuum pressures will cause lesser or higher densities of the collected material load.

Vacuuming continues until the inner collection bag 102 is filled with asbestos or other vacuumed material. This will be signaled when the vacuum switch and gauge reaches a steady vacuum pressure, such as 18" Hg. for more the twenty seconds, at which time the material inlet tube vacuum breaker connected to the inlet pipe will open to stop vacuuming and clear the collection bag entry pipeline of the vacuumed material. After a short delay, the vacuum beaker 164 connected to the tank door 162 will open to relieve the vacuum in the tank so that the tank door 162 can be opened and the filled bag removed. The vacuum pump, air blower, and/or compressor will remain running to provide continuous ventilation to the operator when the operator opens the tank door, thereby exhausting any particulate matter away from the operator while the door is open.

In operation, the material inlet tube vacuum breaker connected to the inlet pipe will open when a high resistance through the collected material load in the perforated inner bag 102 is reached. This will allow atmospheric air to flow in through the material inlet tube vacuum breaker at a high volume and through the collected material; this change of pressure can be sensed by a high vacuum switch at the vacuum pump, air blower, or compressor. The instantaneous high flow of air through the collected material in the perforated inner bag 102 will cause the collected material to become even more dense (compressed). It will also cause vacuuming to cease, as well as sweep the material entry tube (inlet tube) 114 clear of vacuumed material so that when the tank door 162 is opened, the collected material will not fall out. The inlet tube 114 can then be immediately capped by the operator.

After the inner bag 102 is filled with the vacuumed matter, a water spray of fresh, recycled, and/or filtered water is injected into the vacuum tank 156 about the tank door 162 and surrounding areas by one or more tank water nozzles, such as by a pair of diametrically opposite nozzles 186 and 188 located near the top and bottom portions of the tank door 162, pointed longitudinally rearwardly and at an angle of inclination of about 45 degrees towards the centers of the bags, and connected to an external hose and water supply tank. The water is discharged (drained) into the drain pipe 168 to a water reservoir. The operator can then unlatch and swing the tank door open. Immediately thereafter, the inner bag retainer bar 118 is removed from the inlet tube 114 by releasing the over center locking clamp 124.

The closure plate 170 is then immediately placed (pushed) into the front open end 132 of the outer bag 104 to cover the disposable inlet tube 114 and close the outer bag 104. The closure plate will evacuate any free air contained between the inner and outer bags 102 and 104 as well as any free air inside the inner bag 102 which will minimize excess air in the collected load. Thereafter, the operator will pull the outer membrane bag retaining spring 138 over the flared end (lip) 148 of the perforated tube comprising the inner shell 140, which is welded or otherwise permanently secured to the vacuum tank, and snap the retaining spring over the outside surface of the closure plate 170. The retaining spring 138 will draw the closure plate firmly against the inlet tube 114 as well as tighten the outer membrane bag 104 against the inner membrane bag 102. The outer membrane bag 104 can be further tightened against the circular edge of the closure plate 170 by installing and hooking elastic draw cords or springs 172 and 174 across the span of the retaining spring 138. The optional two inch vacuum hose can be connected to a hose port in an adjacent two stage filtering compartment to withdraw excess air from the bag assembly. Thereafter, the two inch hose can be disconnected from the closure plate and the auxiliary two inch vacuum hose connection 184 capped. The inner and outer membrane bags can then be pulled out of the vacuum tank 156 by connecting an elongated hook 182 chained to the tines of a forklift truck, to the eyebolt or eyelet 176. The filled, closed, sealed bags 102 and 104 can then be pulled out of the vacuum tank by the forklift truck. The forklift truck can then lift the filled bags and transport the filled bags to a waste disposal cite.

The operator can place a new solid outer bag 104 in the vacuum tank 156 and retain the outer bag by pushing the rim (open end) of the outer bag upon the flared lip of the perforated tube comprising the inner shell 140. A new perforated inner collection bag 102 can then be placed inside the outer bag and its neck 110 secured to another disposable inlet tube 114, such as with a band, hose clamp, or collar 116. The inlet tube can be secured to the vacuum tank by connecting the retainer bar 118 to yoke-type supports located inside the vacuum tank. The tank door 162 can then be closed and secured by locking the turn buckle latch. The primary material collection receiver 100 is then ready to continue vacuuming by repeating the operating sequence discussed above.

EXAMPLE

Inner and outer bags were arranged in a manner similar to FIG. 1. The bags had a 6 mil thickness and were made of plastic. The inner bag was 60 inches long and had a 33 inch diameter. The outer bag was slightly bigger than the inner bag. The inner bag had punched holes on ½ inch centers. The holes were each about 3/16 inch in diameter. The primary material collection receiver was operated at a vacuum suction pressure slightly less than 18 inches Hg (mercury). The inner bag removed most of the asbestos fibers. Applicant's primary material collection receiver and bags produced unexpected surprisingly good results in removing, collecting, sealing, and disposing asbestos fibers and other hazardous material over conventional vacuum cleaners (loaders) and bags. Among the many advantages of the bag assembly providing the primary material collection receiver and bulk separator compartment are:
1. Superb gross separation and removal of asbestos fibers and large particulates of hazardous material.
2. Compact collection of asbestos and other material.
3. Excellent containment and sealing of the collected material.
4. Good load-carrying, collection capacity and strength.
5. Cost effective.
6. Economical.
7. Easy to install and remove.
8. Simple to use.
9. Effective.
10. Efficient.
11. Dependable.
12. Safe.

Although an embodiment of the invention has been shown and described, it is to be understood that various modifications and substitutions, as well as rearrangements of parts and process steps, can be made by those skilled in the art without departing from the novel spirit and scope of this invention.

What is claimed is:

1. A bag assembly providing a primary material collection receiver, comprising:
   a perforated inner bag defining an array of fluid flow passageways fpr passage of fluid containing asbestos or other particulates;
   a substantially imperforate outer bag positioned about said inner bag;
   a substantially rigid perforated inner shell annularly surrounding said outer bag;
   a substantially rigid imperforate outer tank comprising a substantially solid outer shell spaced radially outwardly and substantially enclosing said rigid perforated inner shell; and a substantially solid shroud having an annular end extending annularly outwardly from said inner shell and a substantially rigid, elongated annular skirt, said skirt being positioned between said inner and outer shells and providing a protective barrier for covering said inner shell to substantially prevent backflow contamination of the exterior surface of said outer bag.

2. A bag assembly providing a primary material collection receiver, comprising:

an inner foraminous bag comprising a substantially fluid permeable, fibrous impervious, flexible membrane having a neck defining an inner access opening, and said inner bag defining a set of fluid flow passageways spaced rearwardly of said inner access opening for passage of air and liquid containing particulates of asbestos or other hazardous material;

an outer bag comprising a flexible, fluid impermeable, substantially solid imperforate membrane positioned about said inner foraminous bag, said outer bag having an open end defining an outer access opening positioned substantially concentrically about said inner access opening;

a closure plate comprising a substantially circular disc for engaging said open end of said outer bag and closing said outer access opening when said inner bag is substantially filled with asbestos or other hazardous material;

attachment means comprising at least one member of the group consisting of an annular retainer spring and a hooked draw cord, for securing said closure plate to said open end of said outer bag; and a forklift-receiving eyelet extending longitudinally outwardly from a central portion of said closure plate to facilitate removal of said bags.

3. A bag assembly in accordance with claim 2 including a vacuum hose connection comprising a tube extending through said closure plate at a positioned radially offset from said eyelet.

4. A bag assembly providing a primary material collection receiver, comprising:

an inner, foraminous, flexible bag comprising a substantially fibrous impervious, water resistant material selected from the group consisting of plastic, paper, and fabric, said inner bag having a neck with an inner access opening, and said inner bag defining a set of fluid flow passageways spaced rearwardly of said inner access opening for passage of air and liquid containing particulates of asbestos or other hazardous material;

an inlet tube extending into said inner access opening of said inner bag;

a detachable collar for detachably connecting and compressibly securing said neck of said inner bag about and against said inlet tube;

at least one outer, flexible, substantially solid, imperforate bag having a maximum diametric span larger than said inner bag, said outer bag being spaced outwardly and positioned about said inner bag, said outer bag comprising a substantially fluid impervious material selected from the group consisting of plastic, fluid impermeable paper, and water resistant fabric, said said outer bag having an open end defining an outer access opening positioned substantially concentrically about said said inner access opening;

a substantially rigid, open ended, foraminous, inner tubular shell comprising an annular perforated tube positioned annularly outwardly and about said outer bag, said foraminous inner shell having an outer surface and an inner surface, said inner surface having a maximum diameter less than the maximum diametric span of said outer bag for engaging said outer bag, said inner shell defining an array of pneumatic vacuum passageways for passage of air to create a vacuum suction to expand and draw said outer bag against said inner surface of said inner shell, said inner shell having one open end positioned generally about the bottom of the outer and inner bags and another open end defining an outlet opening with an outwardly flared lip for abutting against and supporting the open end of said outer bag;

a substantially rigid vacuum tank comprising a substantially solid outer shell having a concave bottom for arcuately supporting and abutting against the bottom of said outer bag, an elongated annular sidewall extending longitudinally from said concave bottom, an outlet tube extending radially outwardly and upwardly from said sidewall in proximity to said concave bottom, and a drain pipe extending radially outwardly and downwardly from said sidewall in proximity to said rim, said annular sidewall being spaced radially outwardly and positioned about said inner shell; and said sidewall of said vacuum tank cooperating with said inner shell to define an annular chamber therebetween for passage of air containing particulates of asbestos or other hazardous material from said outlet opening of said inner shell to said outlet tube of said vacuum tank.

5. A bag assembly in accordance with claim 4 including a closure plate comprising a substantially circular disk for engaging said open end of said outer bag and closing said outer access opening when said inner bag is substantially filled with asbestos or other hazardous material, a forklift-receiving eyelet extending longitudinally outwardly from said closure plate to facilitate removal of said bags, and at least one spring for urging said open end of said outer bag against said closure plate.

6. A bag assembly in accordance with claim 4 including a substantially solid shroud having an annular end extending diametrically outwardly from said inner shell in proximity to said rim and a substantially rigid, elongated annular skirt extending rearwardly from said annular end to said outlet tube, said skirt being positioned between said inner and outer shells and providing a protective barrier for covering said passageways of said inner shell to substantially prevent backflow contamination of the exterior surface of said outer bag.

7. A bag assembly in accordance with claim 6 including a removable retainer bar and clamp for releasably engaging said inlet tube at a location spaced from said inner bag and collar.

8. A bag assembly in accordance with claim 6 wherein said outer bag comprises a double ply membrane bag and said inner bag comprises a perforated plastic bag.

* * * * *